Feb. 1, 1927.

E. CHESHIRE 1,616,027

SPEED VARIATOR

Filed April 25, 1923    3 Sheets-Sheet 1

Witness:
R. Burkhardt

Inventor:
Edward Cheshire,
By Wilkinson, Huxley, Byron & Knight
Attys.

Feb. 1, 1927.
E. CHESHIRE
SPEED VARIATOR
Filed April 25, 1923  3 Sheets-Sheet 2
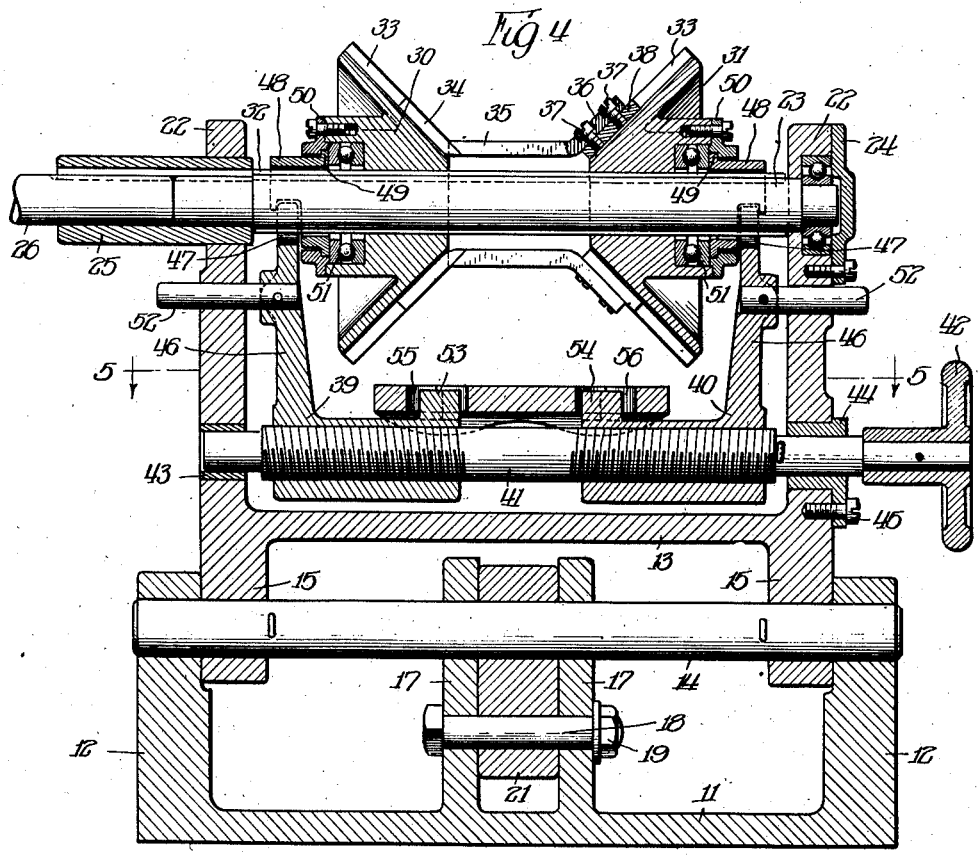
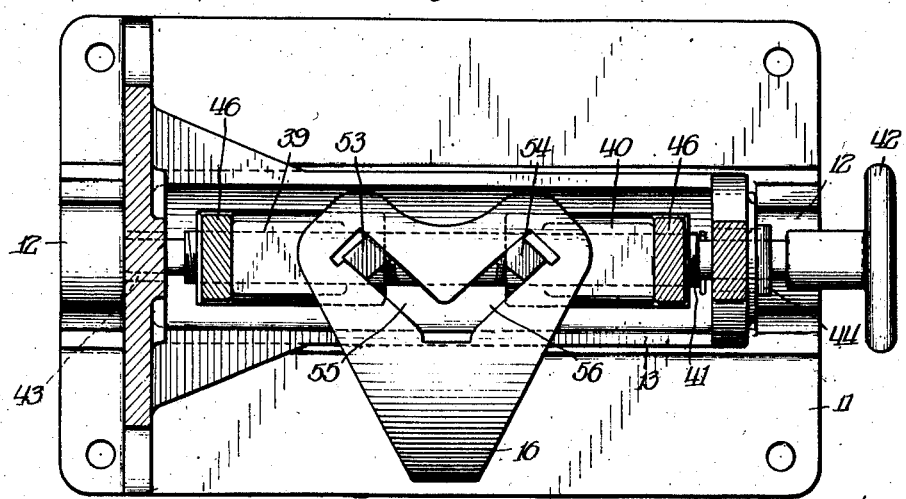

Feb. 1, 1927.
E. CHESHIRE
1,616,027
SPEED VARIATOR
Filed April 25, 1923  3 Sheets-Sheet 3
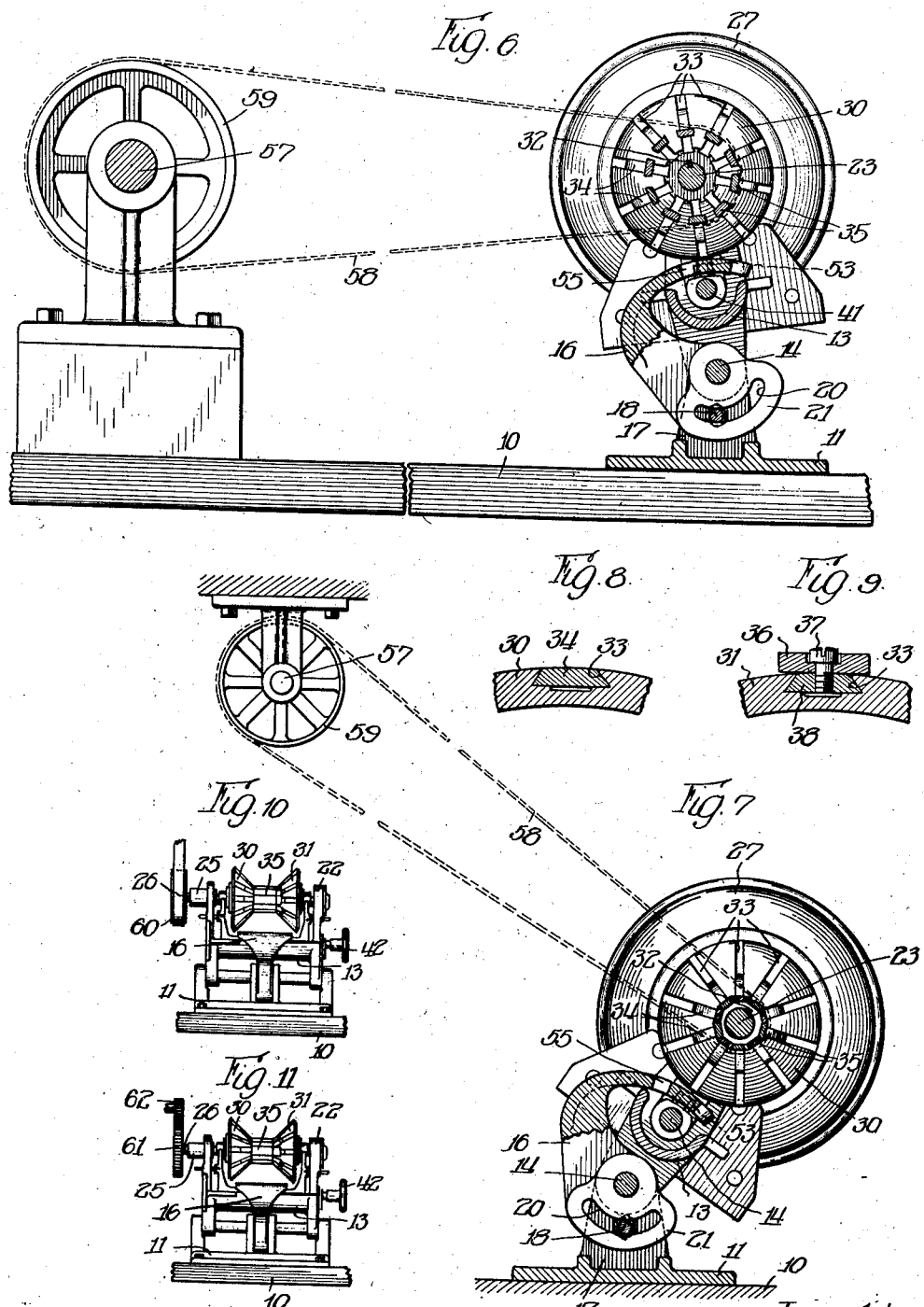
Witness:
R. Burkhardt.
Inventor:
Edward Cheshire,
By Wilkinson, Huxley, Byron & Knight
Attys.

Patented Feb. 1, 1927.

1,616,027

UNITED STATES PATENT OFFICE.

EDWARD CHESHIRE, OF BERLIN TOWNSHIP, WAUKESHA COUNTY, WISCONSIN.

SPEED VARIATOR.

Application filed April 25, 1923. Serial No. 634,432.

This invention relates to a speed variator.

One object of this invention is to vary the speed of a power transmission belt without shifting said belt from one pulley to another or without the use of friction devices.

Another object is to provide a simple, novel and efficient power transmission pulley, the diameter of which may be easily and quickly varied so that the belt cooperating therewith may have its speed varied in accordance with the variation in diameter of the pulley.

Another object is to provide a self-contained speed variator in which the associated belt is automatically maintained in uniform tension as the diameter of the pulley is varied.

Another object is to accomplish the above and at the same time permit a wide change or variation in angular direction in which the belt extends.

Another object is to provide a speed variator which may transmit power in either direction of rotation whether the power is transmitted from a motor, pulley or gears, and to provide a speed variator simple and durable in construction, easily and quickly controlled, and adapted to meet all of the requirements of variable speed transmission in a successful and commercial manner.

These and other objects are accomplished by means of the arrangement shown on the accompanying sheets of drawings, in which—

Figure 4 is an enlarged vertical sectional view of the speed variator;

Figure 5 is a sectional view taken in the plane of line 5—5 of Figure 4 and, among other things, showing the cam by means of which the pulley is bodily moved as its diameter is varied for maintaining the power transmission belt in uniform tension;

Figures 6 and 7 are vertical transverse sectional views taken through the variator and being somewhat diagrammatic to show the relative positions of parts when the power transmission belt is arranged at different angles;

Figure 8 is a sectional view of a portion of the pulley and particularly showing one of the grooved cones of the pulley and a slat slidably mounted therein;

Figure 9 is a similar sectional view showing an opposite portion of the same slat and means for securing it to the slide member in the other cone member of the pulley;

Figure 10 is a front elevation of my variator somewhat diagrammatic and showing the pulley of variable diameter, belt driven from another pulley on the same shaft; and Figure 11 is a somewhat similar diagrammatic front elevation showing the variable diameter pulley driven from gears.

Figure 1:
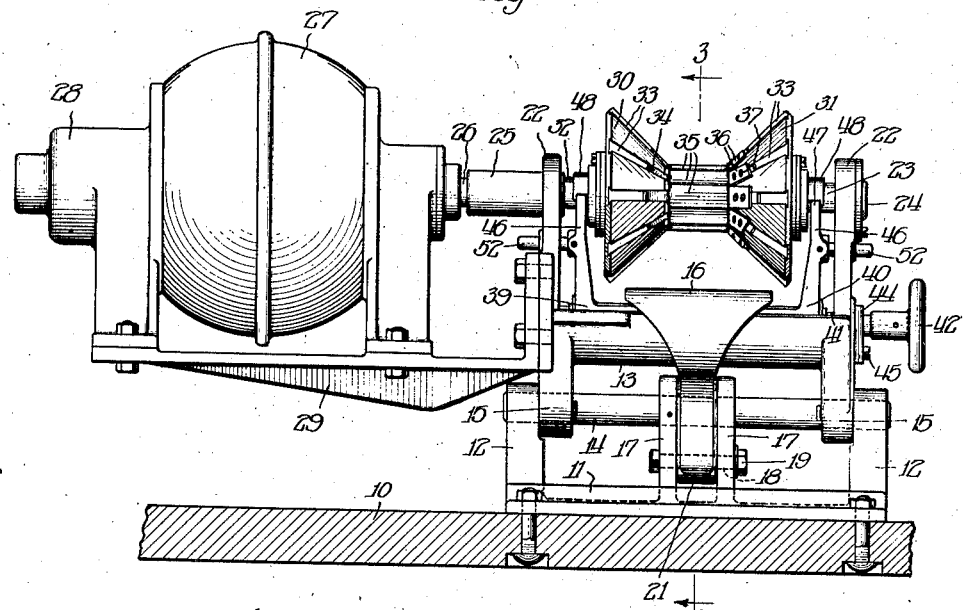
Figure 1 is a side elevation of a speed variator embodying my invention, the pulley, the diameter of which may be varied, in this case being directly driven from a motor which forms a part of a self-contained unit.
Figure 2:
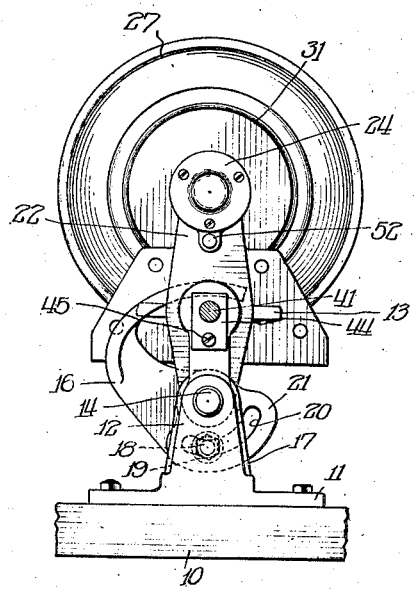
Figure 2 is a fragmentary end elevation of the same arrangement, the shaft for controlling the diameter of the pulley being shown in section.
Figure 3:
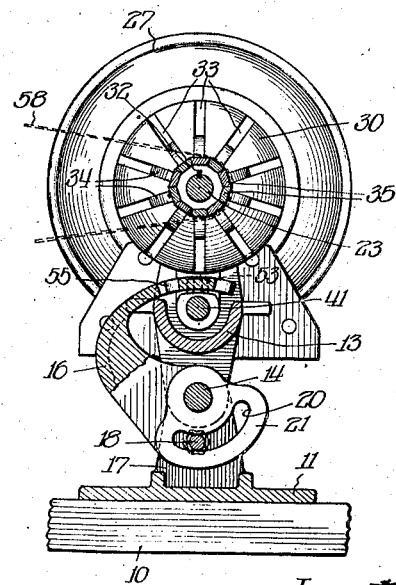
Figure 3 is a sectional view taken in the plane of line 3—3 of Figure 1.

The various novel features of the invention will be apparent from the following description and drawings and will be particularly pointed out in the appended claims.

Referring to the figures of the drawings, a base plate 10 is provided to which is secured in any suitable manner a base pedestal 11 having two upstanding arms 12. A pulley supporting frame 13 is pivotally connected to the arms 12 by a hinge pin 14 which extends through the arms 12 and through arms 15 formed on frame 13. The purpose of hinging the frame 13 to the arms 12 is to permit of bodily compensating movement of the variator pulley proper, as the diameter of the latter is varied, for maintaining the belt uniformly taut, as will be pointed out more particularly hereinafter. A cam 16, which automatically controls the bodily movement of the variator pulley as the diameter of the latter is varied, normally is held stationary between two upstanding arms 17 on the base member 11 by a bolt 18 and nut 19, the former of which extends through the arms 17 and through an arcuate shaped slot 20 in the tail 21 of the cam 16. However, as will be brought out hereinafter, the cam 16 is pivotally adjustably mounted upon the hinge pin 14 to compensate for different angular directions in which the power transmission belt may extend.

Mounted in the upper ends of side arms 22 of the frame 13 is a shaft 23. As shown, the right hand end of the shaft is mounted to run in ball bearings, the latter of which are held in place by a cover plate 24. The opposite end of the shaft is key connected to a bushing 25, which is loosely mounted within the left hand arm 22. Another shaft 26 also is key connected to the bushing 25. As shown in Figure 1 of the drawings, the shaft 26 is the shaft of a motor 27 which forms a direct drive for the pulley shaft 23 on which the variable diameter pulley, to be referred to later, is mounted. Where the pulley shaft 23 is directly driven from a motor, an intermediate bearing such as at the bushing 25 in the left hand frame arm 22 is made loose, the left hand motor bearing 28 and the right hand bearing of shaft 23 acting as the two main supporting bearings. The motor 27 is mounted upon a bracket 29 which is secured to the left hand arm 22 of the pulley frame 13, so that as the pulley frame is rocked through the action of the cam 16, the motor will follow. Accordingly, there can be no binding or other interference in the driving connection between the motor and the pulley shaft 23.

The variable diameter pulley includes two cone-shaped members 30 and 31 which are identical and both of which are keyed to the pulley shaft 23, key 32 being directly engaged by the hubs of the cone-shaped members. Each cone of the pulley has radially extending undercut grooves 33 in its cone face. Slidably mounted in the undercut grooves 33 in the left hand cone 30 are angle portions 34 of slats having horizontal portions 35 which constitute the belt engaging portion of the pulley. Each of these slats is provided with a corresponding inclined portion 36, which is removably secured by means of screws 37 to associated members 38 slidably mounted in undercut grooves 33 of the right hand conical member 31. It is apparent, therefore, that as the conical members 30 and 31 are moved toward each other on shaft 23, the inclined slidably mounted members or portions 34 and 38 will ride radially outwardly in the inclined grooves 33, causing the horizontal portions 35 of the slats to move radially outwardly for increasing the size of the pulley portion which is engaged by the belt. Conversely, it as apparent that if the conical members 30 and 31 are moved away from each other, when the pulley is enlarged, toward the position shown in Figure 4, the diameter of the pulley will be decreased. Accordingly, the belt engaging the pulley will have its speed varied in direct proportion to the variation in diameter of the pulley.

Means are provided for giving movement to the cone-shaped members 30 and 31 toward and away from each other, such means including screw actuated nuts 39 and 40 which travel on a screw 41 having right and and left hand threads. The screw, in this instance, is actuated through a hand wheel 42 secured to one end of the screw 41. One end of the screw is mounted in a bushing 43 in the left hand arm 22 of frame 13 and the other end of the screw is mounted in a removable bushing 44 secured by a screw 45 to the right hand arm 22 of frame 13. Each of the traveling nuts 39 and 40 has an upstanding arm 46 terminating in a fork portion 47 which cooperates with a grooved collar 48 loose on shaft 23 and having a collar 49 clamped between a ring 50, secured to the hub of the associated cone-shaped member 30 or 31, and one thrust member 51 forming a part of the pulley bearing mechanism associated with the cone-shaped members 30 and 31. It is apparent, therefore, that as the nuts 39 and 40 are caused to travel away from each other, the cone-shaped members 30 and 31 similarly are caused to travel away from each other, and when the nuts 39 and 40 are moved toward each other the cone-shaped members 30 and 31 are moved toward each other for varying the effective size of the pulley and in turn varying the speed of travel of the transmission belt. For guiding the nuts 39 and 40 in their movements and for transmitting bodily movements to said pulley, the arms 46 are provided with pins 52 which travel in guide openings in arms 22 of frame 13.

While the cone-shaped members 30 and 31 are moved toward and from each other through actuation of the nuts 39 and 40 for varying the effective size of the pulley, the actuation of the nuts 39 and 40 also automatically causes a bodily movement of said pulley for maintaining the belt uniformly taut. This automatic bodily movement of the pulley is caused by movement of projections 53 and 54, respectively, in the cam slots 55 and 56, respectively, of cam 16; that is to say, as the traveling nuts 39 and 40 are actuated toward each other for increasing the diameter of the pulley, the projections 53 and 54 ride toward each other in cam slots 55 and 56 for bodily moving the pulley toward the other pulley to which it is belted. On the other hand, as the traveling nuts 39 and 40 are moved away from each other for decreasing the diameter of the pulley, the projections 53 and 54 will automatically ride away from each other in slots 55 and 56, respectively, for bodily moving the pulley away from the other pulley to which it is belted for maintaining the power transmission belt in uniform tension throughout.

In the first part of the specification, reference was had to the power transmission belt extending at different angles and the ability of this variator to accommodate itself to these different angular positions of the belt. In this connection it will be noted that in Figure 6 of the drawings the line connecting the centers of shafts 57 and 23 is horizontal. Accordingly, it is apparent that the power transmission belt 58 will be maintained in uniform tension as the pulley is increased in size and bodily moved toward the other pulley 59 and decreased in size and bodily moved away from said other pulley 39. This is because the plane of action or travel of the projections 53 and 54 in cam slots 55 and 56, respectively, is parallel or substantially parallel to the horizontal plane of the line connecting the centers of shafts 57 and 23. Now, to assume an extreme case, let it be assumed that the shaft 57 is placed directly over the shaft 23 or 90° from its present position shown in Figure 6. Under such conditions it is apparent that the bodily movement of the pulley as its diameter is varied would not maintain the transmission belt in uniform tautness. Accordingly, to take care of this contingency it is necessary to vary the angular position of the cam 16 on hinge pin 14. This is done by merely loosening the nut 19 and making the required adjustment. As shown in Figure 7 the relative positions of the shafts 57 and 23 have been changed and the cam 16 adjusted accordingly, so that as the diameter of the variable pulley is increased and decreased the bodily movements of said pulley will be such as to maintain the power transmission belt 58 in uniform tension. The range of effectiveness of cam 16 may be increased by reversing its position upon the hinge pin 14; that is, instead of having the large curved leg portion to the left as shown in Figures 6 and 7, having it to the right.

As shown in Figure 10 and as mentioned in the first part of the specification, the shaft 23 of the variable size pulley may be driven from another belt driven pulley 60 secured to the shaft 26 instead of a motor as shown in Figure 1, or the shaft 23 may be gear driven, one gear 61 being mounted upon the shaft 26 and being driven by the pinion 62. In each case it will be understood that the drive can be in either direction and the variable diameter pulley function in the same manner.

There may be various modifications of the invention as hereinabove particularly shown and described, and it is my intention to cover all such modifications which do not involve a departure from the spirit and scope of the invention as set forth in the appended claims.

I claim:

1. A speed variator comprising a power transmission pulley the effective diameter of which may be varied whereby the speed of a belt associated therewith may be varied, and means including a movable nut and a cooperating member having a cam face engaged by said nut whereby a belt cooperating with said pulley automatically will keep taut as the diameter of said pulley is varied.

2. A speed variator, comprising a power transmission pulley the effective diameter of which may be varied whereby the speed of a belt associated therewith may be varied, and means including a movable threaded member and a member having a cam face engaged by said threaded member whereby said pulley is moved bodily as its diameter is varied for controlling the tautness of the belt.

3. A speed variator, comprising a power transmission pulley the effective diameter of which may be varied whereby the speed of a belt associated therewith may be varied, and means including a movable threaded member and a cooperating member having a cam face engaged by said threaded member whereby said pulley automatically may be moved away from an associated pulley as the diameter of the former pulley is decreased for automatically maintaining the belt associated with said pulleys in uniform tension.

4. A speed variator, comprising a power transmission pulley the effective diameter of which may be varied for varying the speed of an associated belt, and means including an actuated nut and a cooperating member having a cam face engaged by said nut, said means being associated with said pulley whereby the latter automatically is given a compensating movement for maintaining said belt in substantially uniform tension.

5. A speed variator, comprising a power transmission pulley the effective diameter of which may be varied for varying the speed of an associated belt, said pulley including a plurality of relatively movable cone-shaped members whereby variable diameter belt-engaging surface is presented, means including cooperating threaded members for giving said cone-shaped members a relative movement, and means having a cam face engaging with said threaded members whereby said pulley automatically is given a bodily movement to compensate for its variation in diameter for maintaining the associated belt in substantially uniform tension.

6. A speed variator, comprising a power transmission pulley the effective diameter of which may be varied for varying the speed of an associated belt, cam means associated with said pulley whereby the latter automatically is given a compensating movement for maintaining said belt in substantially uniform tension, and adjustably mounted means cooperating with said cam means whereby the direction of the power transmission belt may be changed and a compensating movement of said pulley maintained.

7. A speed variator, comprising a power transmission pulley the effective diameter of which may be varied for varying the speed of an associated belt, means associated with said pulley whereby the latter automatically is given a compensating movement for maintaining said belt in substantially uniform tension, and adjustably mounted means cooperating with the aforesaid means whereby the direction of the power transmission belt may be changed and a compensating movement of said pulley maintained.

8. A speed variator, comprising a power transmission pulley, the effective diameter of which may be varied for varying the speed of an associated belt, said pulley including a plurality of relatively movable cone-shaped members, belt-engaging means actuated by said relatively movable cone-shaped members for presenting a belt-engaging surface of variable diameter, means for giving said cone-shaped members a relative movement, and a cam associated with said last mentioned means whereby said pulley automatically is given a compensating movement as its diameter is varied for maintaining the associated belt in uniform tension.

9. A speed variator, comprising a power transmission pulley the effective diameter of which may be varied for varying the speed of an associated belt, said pulley including a plurality of relatively movable cone-shaped members, belt-engaging members cooperating with said cone-shaped members and actuated by the latter for presenting a belt-engaging surface the diameter of which may be varied, an actuated member for moving one of said cone-shaped members, and a cam associated with said actuated member for automatically giving to said pulley a compensating movement as the diameter of the latter is varied for maintaining the associated belt in uniform tension.

10. A speed variator, comprising a power transmission pulley the effective diameter of which may be varied for varying the speed of an associated belt, said pulley including a plurality of relatively movable cone-shaped members, belt-engaging members cooperating with said cone-shaped members and actuated by the latter for presenting a belt-engaging surface the diameter of which may be varied, an actuated member for moving one of said cone-shaped members, a cam associated with said actuated member for automatically giving to said pulley a compensating movement as the diameter of the latter is varied for maintaining the associated belt in uniform tension, and means for varying the position of the cam so that said compensating movement of such pulley may be accomplished regardless of the angle at which said belt may extend.

Signed at Milwaukee, Wisconsin, this 20th day of April, 1923.

EDWARD CHESHIRE.